United States Patent [19]
Miller

[11] Patent Number: 5,228,276
[45] Date of Patent: Jul. 20, 1993

[54] EDGING ATTACHMENT FOR LINE TRIMMER

[76] Inventor: Roger Miller, 1218 Woodland Park, Garland, Tex. 75040

[21] Appl. No.: 739,289

[22] Filed: Aug. 2, 1991

[51] Int. Cl.⁵ ............................................. A01D 34/84
[52] U.S. Cl. ...................... 56/12.1; 56/12.7; 56/17.2; 30/275.4
[58] Field of Search ............... 56/12.1, 12.7, 16.7, 56/16.9, 17.2; 30/276, 275.4

[56] References Cited

U.S. PATENT DOCUMENTS

| | | | |
|---|---|---|---|
| 3,788,049 | 1/1974 | Ehrlich | 56/16.9 |
| 4,224,784 | 9/1980 | Hansen et al. | 56/16.9 |
| 4,364,435 | 12/1982 | Tuggle et al. | 172/15 |
| 4,442,659 | 4/1984 | Enbusk | 56/12.7 |
| 4,679,385 | 7/1987 | Carmine | 56/16.9 |
| 4,712,363 | 12/1987 | Claborn | 56/16.7 |
| 4,756,148 | 7/1988 | Gander et al. | 56/17.2 |
| 4,803,831 | 2/1989 | Carmine | 56/16.9 |
| 4,914,899 | 4/1990 | Carmine | 56/16.7 |
| 4,922,694 | 5/1990 | Emoto | 56/16.7 |
| 4,981,012 | 1/1991 | Claborn | 56/16.9 |
| 5,029,435 | 7/1991 | Buchanan | 56/12.1 |
| 5,107,665 | 4/1992 | Wright | 30/275.4 X |

*Primary Examiner*—Terry Lee Melius
*Attorney, Agent, or Firm*—Shoemaker and Mattare, Ltd.

[57] ABSTRACT

An attachment for a line trimmer comprises a wheel in the form of a drum having an axis of rotation and a peripheral flange between its ends, the flange extending outward from the drum in a plane perpendicular to said axis, means for supporting the drum from the shaft of the line trimmer, and a clamp, attachable to the trimmer, for securing the supporting means.

4 Claims, 2 Drawing Sheets

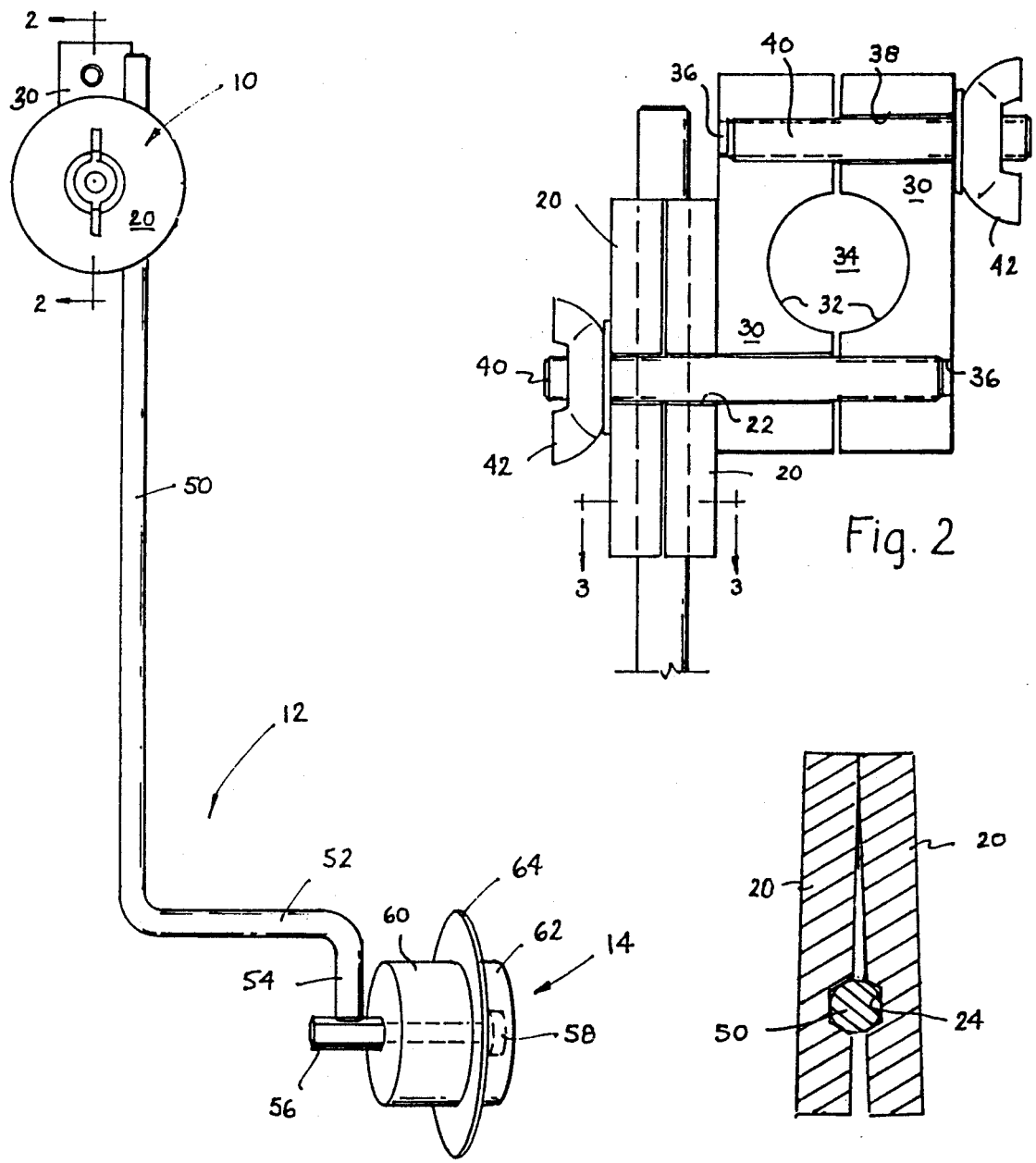

EDGING ATTACHMENT FOR LINE TRIMMER

BACKGROUND OF THE INVENTION

This invention relates generally to lawn cutting apparatus, and more particularly to an attachment for a machine having a rotary head carrying lengths of monofilament material which cut grass as the head rotates, commonly called a line trimmer.

A line trimmer is most often used to cut grass growing around fence posts, trees or the like, and for this purpose is generally used with the cutting head in its normal position, in which the axis of rotation of the head is approximately vertical. However, it is simple to turn the trimmer sideways, and the trimmer can be used in this orientation, with its axis of rotation horizontal, to cut an edge, for example along a sidewalk. However, cutting an edge this way freehand usually does not produce a particularly straight or attractive edge. Therefore, prior inventors have proposed various types of attachments for converting a line trimmer to function as an edger. Representative prior U.S. Pat. Nos. include the following:

3,788,049—Erlich
4,224,784—Hansen et al.
4,364,435—Tuggle et al.
4,442,659—Enbusk
4,679,385—Carmine
4,712,363—Claborn
4,756,148—Gander et al.
4,803,831—Carmine
4,914,899—Carmine
4,922,694—Emoto
4,981,012—Claborn Carmine's patents show a device including an edge guide that runs along the edge of a sidewalk. Several of the above patents show single-wheel guides. Enbusk shows a device which clamps on the drive tube of the trimmer. None of the prior devices of which we are aware is sufficiently simple and easy to install and use to have achieved commercial success.

SUMMARY OF THE INVENTION

In view of the foregoing, it is an object of the invention to enable one to cut a precise edge along the side of a sidewalk or curb.

Another object is to permit the user of a line trimmer to perform edging along pavement while walking either on the pavement, or on the lawn, at his option.

A further object is to construct an extremely simple edging attachment which can be economically produced and sold, and which can be installed on a line trimmer by an unskilled person in a short time.

Yet another object is to enable one to perform edging talks when desired, without interfering with the normal use of the trimmer to cut around vertical obstacles.

These and other objects of the invention are met by an attachment for a line trimmer, comprising a drum having an axis of rotation and a peripheral flange between its ends, the flange extending outward from the drum in a plane perpendicular to said axis, means for supporting the drum from the shaft of the line trimmer, and a clamp, attachable to the trimmer, for securing and supporting means.

BRIEF DESCRIPTION OF THE DRAWINGS

In the accompanying drawings,

FIG. 1 is a slightly oblique side view of a device embodying the invention;

FIG. 2 is an end sectional view thereof, taken along the lines 2—2 in FIG. 1;

FIG. 3 is a sectional view taken along the line 3—3 in FIG. 2; and

DESCRIPTION OF THE PREFERRED EMBODIMENT

Figure 4:
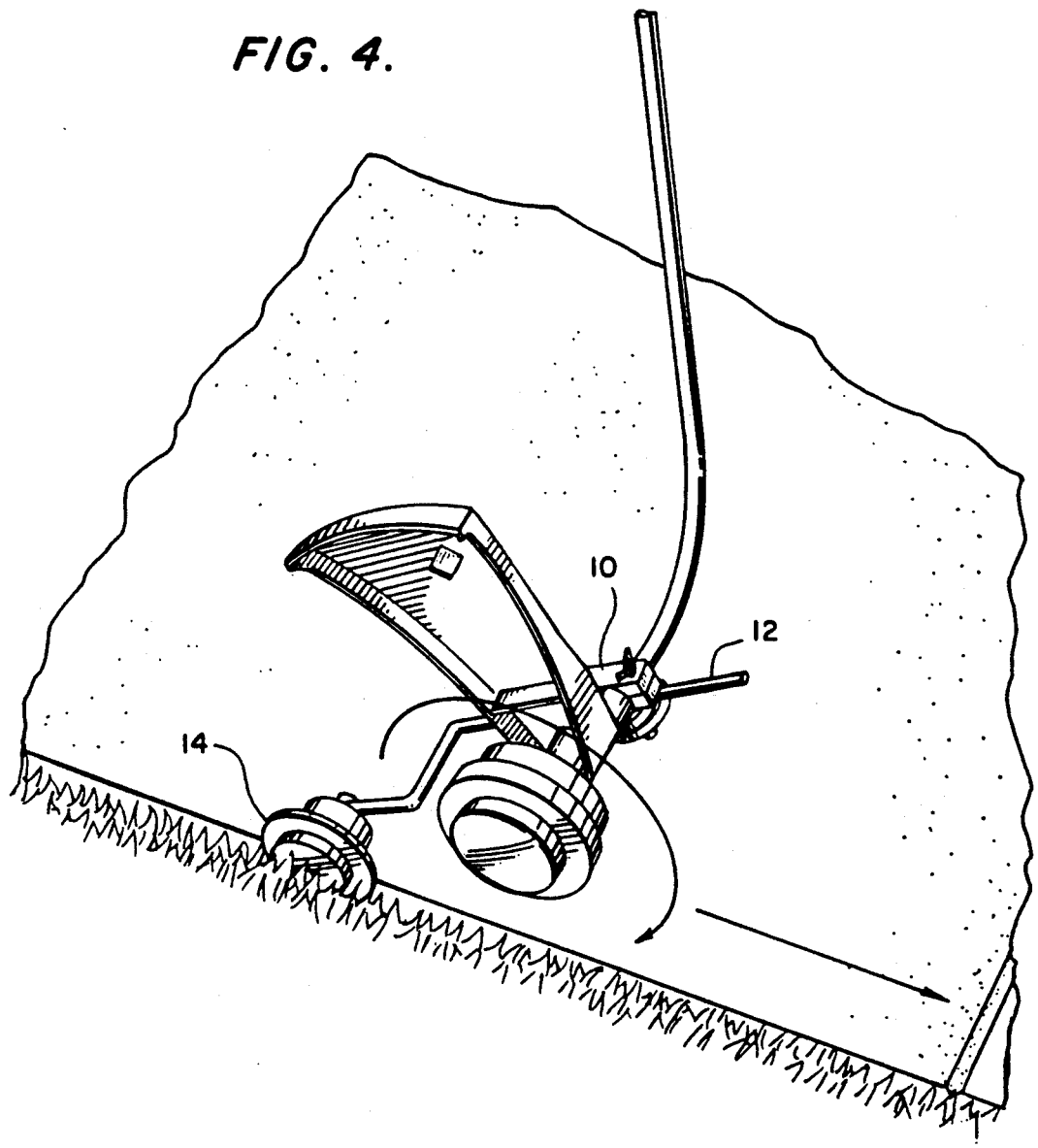
FIG. 4 shows the device attached to a line trimmer, in its intended orientation as a line trimmer.

As shown in FIGS. 1 and 2, a device embodying the invention includes a clamp assembly 10 for connecting the device to a line trimmer, a leg 12 having one end secured within the clamp, and a rotatable wheel 14 affixed at the other end of the leg.

The clamp, appearing in detail in FIG. 2, comprises a pair of metal discs 20, each having a central hole 22 extending through their thickness, and a pair of grooves 24 (FIG. 3), which are opposed, defining a recess that receives one end of the rod. The clamp further comprises a pair of metal blocks 30, generally parallelepipedic in shape, each having an approximately semicylindrical cutout 32. The cutouts are opposed to define a hole 34, bisected by the meeting faces of the blocks, that receives the shaft of a line trimmer, shown in FIG. 4. In each of the blocks, there are holes 36,38 at either end, whose axes are perpendicular to the bisecting plane. In each block, one of the holes, 36, is threaded—the threading being indicated by broken lines—and one end has a smooth bore 38 larger than the major diameter of the threads. A threaded stud 40 is permanently installed in each of the threaded holes, and extends freely through the smooth bore. A wing nut 42 is installed on the exposed end of each stud, so that the clamp can be tightened about the trimmer shaft.

One of the studs, the longer one, extends also through the holes at the centers of each of the clamp discs; therefore, tightening the wing nut on this rod increases the clamping pressure on both the trimmer shaft and the leg.

The leg is formed from a length of ⅜" steel rod, bent at right angles to form a longer segment 50 and a shorter segment 52. The end of the shorter segment is bent 90° near its end to form a toe 54, the end of which is welded to the side of an elongated nut 56 having an internal thread. The wheel is retained at one end of the nut by an Allen screw 58 which is threaded into the nut.

The wheel 14 itself is preferably formed of a plastic material, but metal could be used instead. It comprises a cylinder or drum approximately two inches in diameter, divided into unequal major and minor portions 60 and 62, about one inch long and one-half inch long respectively, by an annular flange 64 about three and a half inches in diameter, extending outward from the periphery of the drum in a plane perpendicular to the axis of the drum. The drum has a hole (not shown) through which the Allen screw is inserted. We have found that no bearing is necessary; however, a bearing or bushing could be interposed between the Allen screw and the drum if desired.

To install the device on a line trimmer, the clamp blocks are separated, and installed around the shaft of the line trimmer, just above the trimmer head. The clamp can be moved up or down on the shaft, to adjust for height. The free end of the rod is inserted between the grooves in the discs, and the wing nuts are tightened to secure both the leg and the trimmer shaft.

The attachment should be installed on the trimmer so that the drum is slightly behind the line trimmer head, in the direction of movement, with the trimmer head turning so as to cut an edge on the downstroke; that is, the leading lines of the trimmer should be moving downward. Furthermore, the flange of the drum should be in the same plane as the rotating cutting lines. This way, as the trimmer cuts a kerf at the edge of the sidewalk, flange of the drum runs in the kerf as one proceeds along the sidewalk. This positive engagement prevents the cutter from encroaching on the lawn, and also prevents it from striking the sidewalk, which would shorten line life.

Inasmuch as the invention is subject to modifications and variations, it is intended that the foregoing description and the accompanying drawings shall be interpreted as illustrative of only one form of the invention, whose scope is to be measured by the following claims.

I claim:

1. An edging attachment for a line trimmer having a drive tube, said attachment comprising a single ground-engaging wheel comprising a drum having an axis of rotation and a peripheral flange permanently affixed to the drum intermediate the ends thereof so that a portion of the drum extends to either side of the flange, the flange extending outward from the drum in a plane perpendicular to said axis, an elongated member having a distal end upon which the wheel is rotatably mounted, and a proximal end, and a single clamp for securing the proximal end of the elongated member to the drive tube of the line trimmer.

2. The invention of claim 1, wherein the peripheral flange divides the drum into minor and major portions.

3. The invention of claim 1, wherein said clamp comprises a pair of discs, each having a groove in one face, said grooves being opposed to define a recess for receiving an end of said elongated member, a pair of blocks having opposed semi-cylindrical cutouts for engaging the trimmer drive tube, and at least one threaded fastener extending through both of said blocks and both of said disks for clamping both said drive tube and said elongated member.

4. The invention of claim 1, further comprising a line trimmer having a drive tube and a rotary cutting head mounted at an end of the drive tube, said head supporting at least one cutting line rotating in a plane perpendicular to an axis of rotation of the head, wherein the flange is substantially in the plane of the cutting line, and the drum is disposed sufficiently far from the head to prevent interference with the line.

* * * * *